Dec. 27, 1955
W. B. FRANTZ
AUTOMATIC GAIN CONTROL SYSTEM FOR
HYPERBOLIC NAVIGATION RECEIVERS
Filed Jan. 13, 1954
2,728,908
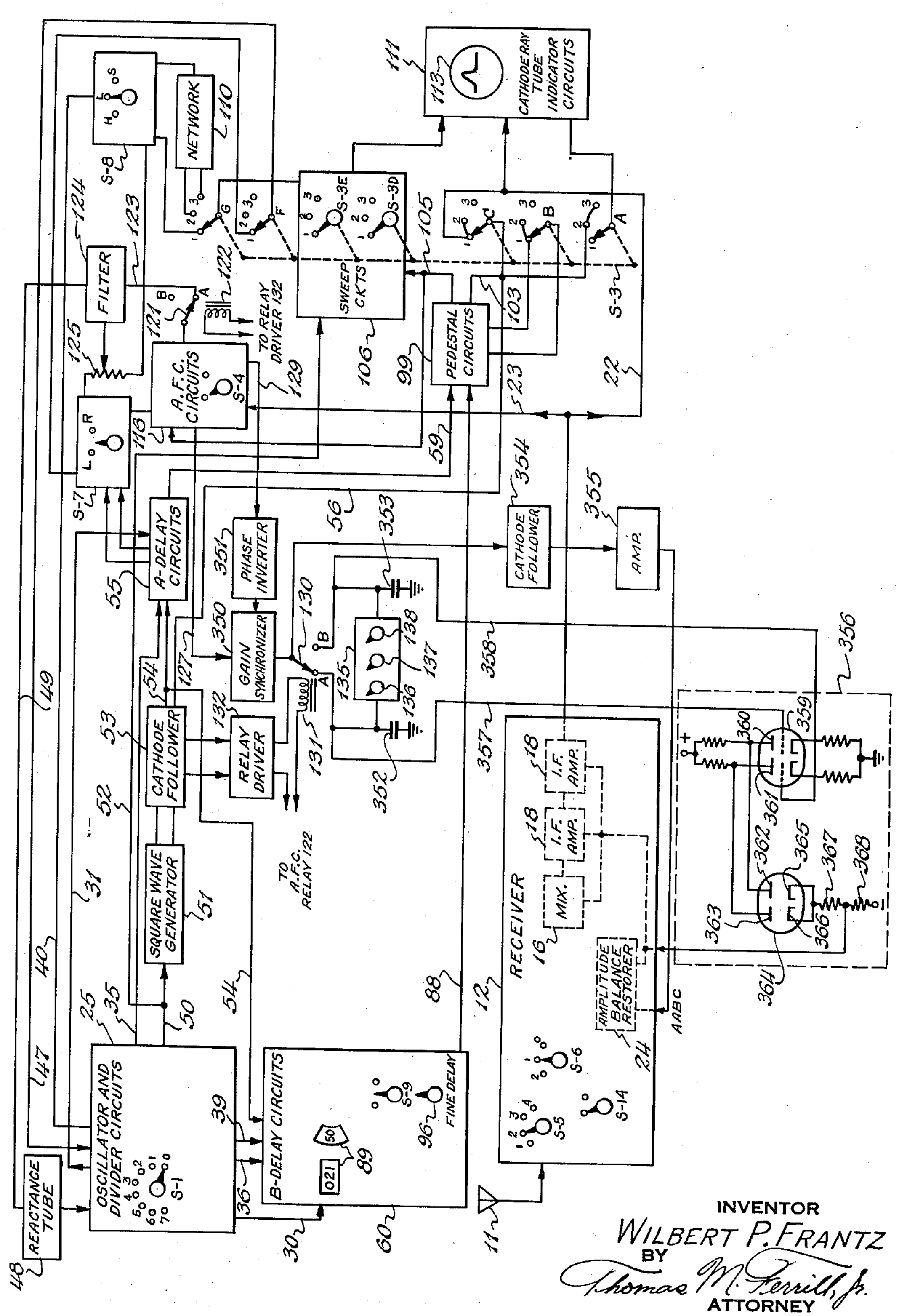
INVENTOR
WILBERT P. FRANTZ
BY
Thomas M. Ferrill, Jr.
ATTORNEY // United States Patent Office 2,728,908

Patented Dec. 27, 1955

2,728,908

AUTOMATIC GAIN CONTROL SYSTEM FOR HYPERBOLIC NAVIGATION RECEIVERS

Wilbert P. Frantz, Long Beach, N. Y., assignor to Sperry Rand Corporation, a corporation of Delaware Application January 13, 1954, Serial No. 403,852

12 Claims. (Cl. 343—103)

The present invention relates to automatic gain control systems, and in particular to improved automatic gain control systems useful in loran receiver-indicators.

In my Patent 2,651,033, I have taught a system of automatic gain control for a loran receiver-indicator in which the gain of the receiver is automatically determined by the strength of the received master pulses. This AGC system operates in conjunction with an automatic amplitude balance control system to maintain the amplitudes of received output master and slave pulses at a suitably constant and equal peak value.

In the prior art manually operated loran receiver-indicators, an operator maintains the amplitudes of received output master and slave pulses at a suitably constant and equal peak value by manipulating a receiver manual gain control and a manual amplitude balance control. The receiver's manual gain control is first adjusted by the operator to a position which will allow the loran receiver to amplify the weaker or smaller of the received master or slave pulses to a suitable output level, and then the manual amplitude balance control is adjusted to reduce the amplification of the stronger or larger of the received master or slave pulses until the received output master and slave pulses are substantially equal in peak value.

An improvement in these prior art manually operated loran receiver-indicators can be made by reducing the number of manual adjustments, and by providing automatic controls whenever possible as has been taught in my aforesaid patent. The present invention discloses an alternative system of automatic gain control which may be used in these prior art loran receiver-indicators to replace the manual control of receiver gain by an operator, and this alternative system may be used either with or without the automatic balance control system as taught in my aforesaid patent. The present invention distinguishes over the AGC system of the aforesaid patent in that the loran receiver gain is not solely determined by the amplitude of the received master pulses, but is determined by the amplitude of the smaller of the received master or slave pulses.

Accordingly, a principal object of the present invention is to automatically control the amplification of a loran receiver-indicator in accordance with the amplitude of the smaller of the received master or slave pulses.

Another object of the invention is to automatically control the gain of a loran receiver-indicator similar to the manner in which it has been manually controlled heretofore by an operator.

A further object is to provide a loran receiver-indicator with an automatic gain control system which automatically enables the receiver to amplify the smaller of the received master or slave pulses to a predetermined output level.

Still another object is to provide automatic increase of the gain of a loran receiver-indicator to its maximum limit upon the loss of reception of either or both the master or slave pulses.

In accordance with the present invention there is introduced an automatic gain control system responsive to received first and second independent pulse voltages and producing an automatic gain control voltage according to the amplitude of the smaller of the first or second pulse voltages. The automatic gain control voltage is applied to a suitable control circuit for substantially suppressing variations in the amplitude of the smaller of the first or second pulse voltages.

The above objects of and the brief introduction to the present invention will be more fully understood, and further objects and advantages will become apparent from a careful study of the following detailed description in connection with the drawing, wherein the single figure illustrates a combination block and schematic diagram of a loran receiver-indicator employing the improved automatic gain control system of the present invention.

Those elements in the accompanying drawing fully corresponding to those in my aforesaid Patent 2,651,033 are identified by the same reference numerals as employed therein.

Referring to the single figure, loran A and B pulses of carrier-wave energy from remote master and slave stations are collected by antenna 11 and supplied to the input of superheterodyne receiver 12. Receiver 12 is identical to the receiver shown and described in the aforesaid Patent 2,651,033. The received A and B pulses are amplified, detected, and supplied as positive A and B pulses over lead 22 to the cathode-ray tube indicator circuits 111, and over lead 23 to an input of the AFC circuits 116. An automatic gain control voltage from the AGC circuits of the present invention is supplied to the gain controlling electrodes of mixer 16, I. F. amplifiers 18, and the amplitude balance restorer 24 as will be explained more fully hereinafter. An amplitude balance control voltage also is supplied to receiver 12 as will be explained hereinafter.

The precision timing circuits of the loran receiver-indicator comprise the oscillator and divider circuits 25, the square-wave generator 51, the A delay circuits 55, and the B delay circuits 60. These circuits are similar to those described and claimed in application S. N. 633,473, filed December 7, 1945, in the name of Winslow Palmer, entitled "Timing Apparatus" and assigned to the same assignee of the present invention. They are identical with those shown and described in my aforesaid patent, and, therefore, will be described only briefly in the present specification.

*Oscillator and divider circuits*

The conventional oscillator and divider circuits of block 25 comprise a crystal-controlled oscillator operating at a frequency of 100 kilocycles-per-second, and a cascade of five frequency dividers, dividing the frequency of the oscillator output voltage in the steps of 5, 4, 5, 5, and 4 respectively, followed by a transient delay circuit. These frequency divider circuits supply the basic timing voltages for the loran receiver-indicator. The output voltage from the first frequency divider is supplied over lead 30 to one input of the B delay circuits 60, and over lead 31 to one of the inputs of the A delay circuits 55. The output voltage from the third frequency divider is supplied over lead 35 to another input of the A delay circuits 55, and over the lead 36 to a second input of the B delay circuits. The output voltage from the fourth frequency divider is supplied over lead 39 to a third input of the B delay circuits. The output voltage from the transient delay circuit is coupled over lead 50 to the input of the square-wave generator 51, and over lead 52 to the sweep circuits 106.

The basic pulse repetition rates used in loran are 33⅓, 25, and 20 cycles per second, and are identified by the letters H, L, and S. These pulse repetition rates are provided in the oscillator-divider circuits 25 by the basic PRR switch S–8 coupled over lead 40 to the fifth frequency divider of the oscillator-divider circuits. This switch S–8 controls the frequency division of the fifth frequency divider to provide a division of 3 for the rate H, 4 for the rate L, and 5 for the rate S. In addition to the three basic pulse repetition rates H, L, and S, seven additional specific pulse repetition rates identified as 0 through 7 are employed in loran. The specific PRR switch S–1 controls the feedback of pulses from the output of the fifth frequency divider to the inputs of the second and third frequency dividers to provide these specific rates in the oscillator-divider circuits 25.

A reactance tube circuit 48 is coupled to the 100 kilocycle-per-second crystal oscillator, and corrects the frequency of this oscillator in response to an automatic frequency control voltage supplied over lead 49 from the AFC circuits 116. A description of these AFC circuits will appear hereinafter.

*Square-wave circuits*

The positive output pulse voltage on lead 50 from the oscillator and divider circuits is differentiated at the two inputs of an Eccles-Jordan circuit used as a square-wave generator 51 to produce a square-wave output voltage whose frequency is equal to one-half the repetition frequency of the differentiated triggering pulses. The frequency of this square-wave voltage corresponds to the pulse repetition frequency of the loran signals. The mark and space time intervals of the square-wave voltage are each equal to 20,000 microseconds for the selected loran pulse repetition rate LO. The square-wave output voltage from generator 51 is supplied to a push-pull cathode follower 53.

Cathode follower 53 produces two square-wave output voltages, one inverted in phase with respect to the other, and one of these square-wave voltages is supplied over lead 54 to the input of the A delay circuits 55 and to the B delay circuits 60. The other square-wave voltage is supplied over lead 56 to the arm of operations switch S–3C. Both of the square-wave voltages are supplied to the relay driver 132. The negative half-cycle of the square-wave voltage on lead 54 energizes the A delay circuits 55, and this voltage is subsequently synchronized with respect to the received loran signals so as to correspond with the time interval during which the A pulses from the master station arrive at the receiver 12. The positive half-cycle of the square-wave voltage on lead 54 energizes the B delay circuits 60, and corresponds to the time interval during which the B pulses from the slave station will arrive at the receiver.

*A delay circuits*

The A delay circuits 55 comprise a pedestal delay circuit and a pedestal synchronizer, as is more fully described in my aforesaid patent. The square-wave voltage on lead 54 is differentiated to produce negative trigger pulses coincident with the trailing or "negative going" edges of the square-wave voltage, and these negative trigger pulses initiate the pedestal delay circuit. The voltage on lead 35 from the third frequency divider is also differentiated and applied to the pedestal delay circuit to terminate the pedestal delay circuit by the first of the trigger pulses to arrive following the initiation of the pedestal delay circuit. The output from the pedestal delay circuit is a series of positive pulses of one-thousand microseconds duration and whose recurrence interval equals the recurrence interval of the square-wave voltage on lead 54.

Both positive and negative output pulses from the pedestal delay circuit are applied to the "left-right" switch S–7. The positive pulses are coupled through the "left" position of switch S–7 and through position 1 of switch S–3F to the input of the third frequency divider over the lead 47 to delay the triggering of the third frequency divider by one more of its 200 microsecond input pulses. This causes an increase in the recurrence interval of the output pulses from the fifth divider which results in an increase in the recurrence interval of the sweep voltage applied to the cathode-ray tube indicator circuits 111. This increase in sweep recurrence interval causes the received loran pulses to drift slowly across the face of the cathode-ray tube toward the left. Conversely, the negative pulses from the pedestal delay circuit are coupled to the "right" position of switch S–7 and through position 1 of switch S–3F and over lead 47 to the input of the third frequency divider in order to pretrigger this divider by one less of its 200 microsecond input pulses. This reduction in recurrence interval results in a shorter sweep recurrence interval thereby causing the received loran pulses delineated upon the face of the cathode-ray tube to drift slowly across the face of the tube toward the right. When the "left-right" switch S–7 is in its neutral position, there is no feedback of pulses and consequently there is very little if any drift of the delineated loran pulses.

The pedestal synchronizer is triggered by negative pulses derived from and coincident with the trailing edges of the positive output pulses from the pedestal delay circuit. The pedestal synchronizer is terminated by the first of the fifty microsecond negative trigger pulses on lead 31 to arrive following the initiation of the pedestal synchronizer. The output from the pedestal synchronizer is a series of positive pulses of approximately fifty microseconds duration and whose recurrence interval equals the recurrence interval of the square-wave voltage on lead 54. The trailing edges of these output pulses are delayed approximately one-thousand and fifty microseconds from the trailing edges of the square-wave voltage on lead 54, and the timing of the trailing edges of these output pulses is under the accurate control of the pulses on lead 31 from the first frequency divider. These recurrent output pulses are coupled over lead 59 to the input of pedestal circuits 99.

*B delay circuits*

The B delay circuits 60 are similar to those shown and described in the aforesaid application S. N. 633,473, and are identical to those shown and described in my aforesaid Patent 2,651,033. The function of the B delay circuits is to produce recurrent variably delayed output pulses whose recurrence interval is equal to the recurrence interval of the square-wave voltage on lead 54, and whose time delay with respect to the recurrent output pulses from the A delay circuits 55 is adjustable by accurately known amounts indicated on a time difference counter 89. This time delay difference is established with an absolute accuracy better than 1 microsecond. The recurrent variably delayed output pulses from B delay circuits 60 occur during the time interval that the half-cycle of the square-wave voltage on lead 54 is positive. The recurrent output pulses from the A delay circuits occur during the time interval that the half-cycle of the square-wave voltage on lead 54 is negative. Therefore, a fixed time delay exactly equal to one-half the recurrence interval of the square-wave voltage on lead 54 exists between the recurrent pulses from the B delay circuits 60 and the recurrent pulses from the A delay circuits 55 in addition to the variable time delay introduced by the B delay circuits.

The recurrent variably delayed output pulses on lead 88 from the B delay circuits 60 are approximately 30 microseconds in duration, and are variable in time relative to the leading edges of the square-wave voltage on lead 54 smoothly and unambiguously over the range of from 1,050 to almost 20,000 microseconds. Moreover, the trailing edges of these variably delayed pulses vary in time relative to the trailing edges of the output pulses from the A delay circuits 55 on lead 59 smoothly and continuously over the range of exactly 0 to almost 20,000 microseconds plus exactly one-half the recurrence time interval of the received loran A and B pulses under the control of the course delay switch S–9 and the fine delay control knob 96.

*Pedestal circuits*

The pedestal circuits 99 comprise a pulse mixer and a pedestal generator. Negative trigger pulses derived by differentiating the trailing edges of the positive recurrent output pulses on lead 59 are combined with negative trigger pulses derived by differentiating the trailing edges of the positive recurrent output pulses on lead 88 in the pulse mixer. Each of these negative trigger pulses initiate the pedestal generator, a monostable multivibrator, which is terminated automatically by its own action. The pedestal generator provides a separate positive and a negative pulse output voltage. These pedestal pulses are of approximately 1,300 microseconds duration for positions 1 and 2 of operations switch S–3B, and are approximately 175 microseconds duration for position 3 of S–3B. The positive pedestal output pulses are supplied over lead 103 to the arm of operations switch S–3C, and also to terminals 2 and 3 of switch S–3A. The pedestal pulses initiated by the pulse voltage on lead 59 produce the A pedestal, and the variably delayed pedestal pulses initiated by the pulse voltage on lead 88 produce the B pedestal. The square-wave voltage from the cathode follower 53 appearing on lead 56 is combined with the positive pedestal pulses on lead 103. The negative pedestal pulses are supplied over lead 105 to the sweep circuits 106, and also to one input of the AFC circuits 116.

*Sweep circuits*

The sweep circuits 106 include a gate generator, a sweep generator for producing a slow, medium, or fast sweep-speed voltage, and a sweep restorer. Trigger pulses produced from the trailing edges of the recurrent output voltage from the oscillator-divider circuits 25 on lead 52 initiate the sweep generator to produce the slow sweep-speed voltage. When the switch S–3E is in position 1, this slow sweep-speed voltage is supplied to one input of the cathode-ray tube indicator circuits 111. The medium and fast sweep-speed voltages are produced when the operations switch S–3E is in the positions 2 and 3, respectively, and these sweep voltages are initiated by the recurrent negative pedestal pulses supplied over lead 105. The sweep generator produces a linear, medium sweep-speed voltage coincident with and for the duration of the recurrent negative pedestal pulses when switch S–3E is set to position 2. Similarly, the fast sweep-speed voltage is coincident with and extends for the duration of the recurrent negative pedestal pulses when the operations switch S–3 is set to position 3.

Network 110 coupling basic PRR switch S–8 with switch S–3G serves to maintain the amplitudes of the three sweep-speed voltages of constant value for the three basic pulse repetition rates H, L, or S. The sweep restorer included within the sweep circuits 106 clamps the lower edges of the three sweep-speed voltages to a reference voltage level to insure that the cathode-ray trace on the face of the cathode-ray tube starts from the same point on the face for each of the three sweep voltages.

*Cathode-ray tube indicator circuits*

The cathode-ray tube indicator circuits 111 include a cathode-ray tube, a horizontal sweep amplifier, a vertical amplifier, and an intensity restorer. The sweep voltages from the sweep circuits 106 are amplified in the horizontal sweep amplifier and applied to the horizontal deflection plates of the cathode-ray tube 113. The vertical amplifier amplifies the composite voltage consisting of the pedestal pulses on lead 103, the square-wave voltage on lead 56, and the received loran A and B pulses on lead 22, and supplies these voltages to the vertical deflection plates of the cathode-ray tube 113. The pedestal pulses on lead 103 are supplied through positions 2 and 3 of switch S–3A to the input of the intensity restorer. The restorer clamps the upper edges of these positive pedestal pulses to a fixed voltage level corresponding to normal intensity of the cathode-ray trace on the face of the cathode-ray tube, and the negative portion of these pedestal pulses, corresponding to the time intervals between sweeps, bias the control-grid of the cathode-ray tube so as to blank the cathode-ray beam.

*Automatic frequency control circuits*

The automatic frequency control circuits 116 are similar to those described and claimed in Patent 2,636,988 and are identical with those as shown and described in my aforesaid Patent 2,651,033. The AFC circuits 116 include an AFC delay circuit, an AFC amplifier, and an AFC synchronizer. Negative trigger pulses derived from the leading edges of the negative A and B pedestal pulses on lead 105 initiate the AFC delay circuit. This circuit produces negative output pulses of approximately 100 microseconds duration, and these negative pulses are applied to a differentiating circuit at one input of the AFC synchronizer, and to the gain synchronizer 350 over lead 127.

The differentiating circuit at one input of the AFC synchronizer produces first and second positive output trigger or sampling pulses from the trailing edges of the negative 100 microsecond pulses. The first positive sampling pulses are delayed 100 microseconds from the leading edges of the negative A pedestal pulses on lead 105, and the second positive sampling pulses are delay 100 microseconds from the leading edges of the negative B pedestal pulses on lead 105.

Received A and B pulses from receiver 12 are supplied over lead 23 to the AFC amplifier where they are further amplified and supplied to a differentiating circuit at another input of the AFC synchronizer. AFC switch S–4 coupled to the AFC amplifier places the AFC circuits 116 in operation. The output of the AFC amplifier is grounded by the "left-right" switch S–7 to disable the operation of the AFC during the "left" or "right" positions to allow for proper operations of the drift circuits.

The AFC synchronizer produces first and second recurrent output pulses of current. The amplitude of the first pulses varies according to the relative time position or coincidence between the applied differentiated A pulses and the applied first positive sampling pulses from the differentiating circuit at the input of the AFC synchronizer. The amplitude of the second pulses of current varies according to the relative time position or coincidence between the applied differentiated B pulses and the second positive sampling pulses from the differentiating circuit. These first and second output pulses of current are applied to the armature 121 of relay 122. The relay is energized by the square-wave voltage from the relay driver 132 to separate the first output pulses of current from the AFC synchronizer from the second output pulses of current. The first output pulses, varying according to the relative time position of the differentiated A pulses with respect to the applied first positive sampling pulses, are applied over lead 123 to a long time constant filter 124 where they are integrated to produce the automatic frequency control voltage. This AFC voltage biases reactance tube 48 so as to maintain the frequency of the 100 kilocycle-per-second oscillator in the oscillator divider circuits 25 such that the first positive sampling pulses applied to the AFC synchronizer are coincident with the differentiated A pulses.

The magnitude of the control voltage on lead 49 is under the independent manual control of the drift potentiometer 125 and "left-right" switch S–7 coupled to the filter 124. The "left-right" switch S–7 provides two fixed negative control voltages of different magnitudes for biasing reactance tube 48, in addition to supplying feedback pulses to the third frequency divider through switch S–3F as explained heretofore in connection with the A delay circuits 55. In the "left" position of switch S–7, one of these negative control voltages causes the delineated pulses on the face of the cathode-ray tube 113 to drift slowly across the face of the tube to the left, while in the "right" position of switch S–7 the other negative control voltage causes a drift of the delineated loran pulses to the right. The drift potentiometer 125 provides an adjustable negative control voltage from filter 124 for slowly drifting the delineated A and B pulses either to the right or to the left. These manual controls facilitate the alignment of the received loran A and B pulses atop their respective A and B pedestals. The basic PRR switch S–8 coupled to filter 124 through potentiometer 125 provides three separate time constants for the filter corresponding to the three basic pulse repetition rates H, L, or S.

*Automatic amplitude balancing circuits*

The automatic amplitude balancing circuits now to be described are distinct from those described in my aforesaid Patent 2,651,033, and these circuits are more fully described and claimed in my application S. N. 403,771, filed concurrently herewith entitled "Automatic Amplitude Balance Control System for Hyperbolic Navigation Receivers," and assigned to the same assignee as the present invention. Recurrent negative 100 microsecond pulses are supplied from the AFC circuits 116 over lead 127 to a differentiating circuit at one input of a gain synchronizer 350. The differentiating circuit produces first and second positive sampling pulses from the trailing edges of these recurrent negative 100 microsecond pulses in the same manner as described in connection with the AFC circuits 116. These first and second positive sampling pulses may be amplified before energizing the synchronizer 350. Negative loran A and B pulses are supplied from the AFC circuits 116 over lead 129 to a phase inverter 351. Positive loran A and B pulses from the output of the phase inverter 351 are supplied to another input of gain synchronizer 350. The gain synchronizer may be of the four-diode switch type as shown in Fig. 10.10 on page 374 of the book "Waveforms" published by the McGraw-Hill Book Company, 1949.

The gain synchronizer produces first recurrent output pulses of current whose amplitude varies according to the relative time position or coincidence between the first positive sampling pulses and the loran A pulses, and produces second recurrent output pulses of current whose amplitude varies according to the relative time position between the second positive sampling pulses and the loran B pulses. Since the first positive sampling pulses have been made to occur coincident with the cross-over of the differentiated A pulse by action of the AFC system, as taught in Patent 2,636,988, these particular positive sampling pulses occur at instants corresponding to the peak of the received loran A pulses. Accordingly, the output pulses of current from the gain synchronizer which result from the coincidence of the first positive sampling pulses and the A pulses vary according to the peak value of the A pulses.

In a similar manner, the second positive sampling pulses are brought into coincidence with the loran B pulses to produce output current pulses from the gain synchronizer which vary according to the peak value of the B pulses. Since the second positive sampling pulses are derived from the variably-delayed B pedestal pulses on lead 105, they are likewise variably-delayed pulses. In order to bring the second positive sampling pulses into coincidence with the received loran B pulses, the time position of these positive pulses is varied under the control of coarse delay switch S–9 or the fine delay knob 96 of the B relay circuits 60 in order to match the received loran A and B pulses on the face of the cathode-ray tube 113 as in the normal operating procedure. When the A and B pulses are properly matched on the face of the cathode-ray tube 113, the second postive sampling pulses are coincident with the peak value of the received loran B pulses.

The first and second recurrent output pulses from the gain synchronizer 350 are coupled to the armature or movable contact 130 of relay 131. The winding of relay 131 is energized by the square-wave voltage from the relay driver 132. The armature 130 of relay 131 vibrates in synchronism with the square-wave voltage to separate the first recurrent output pulses from the second recurrent output pulses. The first output pulses of current varying according to the amplitude of the A pulses are supplied to a condenser 352, and the second output pulses of current varying according to the amplitude of the received B pulses are supplied to a condenser 353. The condenser 352 is charged to a potential varying according to the value of the first current pulses, and the condenser 353 is charged to a potential varying according to the value of the second current pulses. The armature 130 of relay 131 alternates between the charged potential on condenser 352 and the charged potential on condenser 353 at the frequency of the square-wave voltage supplied to the relay 131. This alternating voltage on armature 130 is the automatic amplitude balance control voltage, as will be more fully explained in the aforesaid copending application S. N. 403,771, and this AABC voltage is supplied through cathode follower 354 and amplifier 355 to the amplitude balance restorer 24 in receiver 12.

Control box 135 includes an automatic balance control on-off switch 136, a manual gain control 137, and a manual amplitude balance control 138, as explained in my aforesaid Patent No. 2,651,033. When the switch 136 is in the off position, the control box supplies manually adjustable control voltages across each condenser 352 and 353. The manual gain control 137 raises and lowers the applied control voltages together, and the manual amplitude balance control 138 raises the voltage supplied to one condenser while lowering the voltage supplied to the other condenser.

*Automatic gain control circuits*

The automatic gain control circuits of the present invention include a double-triode amplifier and a double-diode selector situated within box 356. These circuits within box 356 are responsive to the potentials across the condensers 352 and 353, as supplied over leads 357 and 358, to produce an automatic gain control voltage in a manner now to be described. The voltage across condenser 352 is amplified in the first triode section of double-triode amplifier tube 359, and similarly, the voltage across condenser 353 is amplified in the second triode section of tube 359. The magnitude of the voltage on anode 360 of the first triode section varies inversely with respect to the peak amplitude of the received loran A pulses, and the magnitude of the voltage on anode 361 of the second triode section varies inversely with respect to the peak amplitude of the received loran B pulses. Anodes 362 and 363 of the double-diode tube 364 are coupled respectively to the anodes 360 and 361 of tube 359. The cathodes 365 and 366 of double-diode 364 are coupled together and to the upper terminal of a voltage divider composed of resistors 367 and 368. A negative voltage is supplied to the lower terminal of resistor 368.

The voltage on the inter-coupled cathodes 365 and 366 is determined by the smaller of the output voltages on the anodes 360 and 361 of the tube 359 in the following manner. For the condition where the amplitude of the received A pulses is smaller than the amplitude of the received B pulses, the magnitude of the voltage across condenser 352 is smaller than the voltage across condenser 353. Accordingly, the voltage at the inter-coupled anodes 360, 362 will be larger (more positive) than the voltage on the inter-coupled anodes 361, 363. As a result, the first diode section of tube 364 will conduct raising the voltage on its cathode 365 to a value very nearly equal to the voltage on its anode 362. Since the voltage applied to anode 362 is more positive than the voltage applied to anode 363, the voltage on the inter-coupled cathodes is likewise more positive than the applied voltage on anode 363. Accordingly, the second diode tube will not conduct, and the cathode voltage is determined by and very nearly equal to the voltage on the inter-coupled anodes 360 and 362. The voltage divider sets the voltage level at the junction of resistors 367 and 368 at a suitable negative level, and the control voltage at this junction is the automatic gain control voltage. This AGC voltage is supplied to the gain controlling electrodes of the mixer 16, I. F. amplifiers 18, and the amplitude balance restorer 24 in receiver 12. As the voltage on the inter-coupled anodes 360, 362 becomes more positive due to a decrease in the amplitude of the received A pulses, the AGC voltage at the junction of resistors 367 and 368 will become less negative which will cause an increase in receiver gain, thereby tending to suppress variations in the strength of the received output loran A pulses.

For the condition where the amplitude of the received B pulses is smaller than the amplitude of the received A pulses, the magnitude of the voltage across condenser 353 is smaller than the voltage across condenser 352. Accordingly, the voltage on the inter-coupled anodes 361 and 363 will be more positive than the voltage on the inter-coupled anodes 360, 362. The second section of diode 364 will now conduct, and the voltage on the inter-coupled cathodes 365 and 366 is determined by the voltage on the anode 363. The AGC voltage will vary the gain of receiver 12 in a manner which tends to suppress variations in the amplitude of the received B pulses.

The loran receiver-indicator with the improved automatic gain control system of the present invention is adjusted by an operator to obtain useful navigational information in an identical manner as explained in my aforesaid Patent 2,651,033 under the section entitled "Operation of Improved Loran Receiver-Indicator."

The AGC system of the present invention is not limited solely to manually operated loran receiver-indicators but may be employed in automatic tracking loran receiver-indicators of the type described and claimed in pending application S. N. 267,347, now Patent 2,697,219, filed on January 21, 1952, in the name of Roger B. Williams, Jr., entitled "Automatic Time Difference Measuring Circuits" and assigned to the same assignee as the present invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radio navigation receiver responsive to recurrent A pulses transmitted from a master station and to recurrent B pulses transmitted from a slave station, wherein the strength of the received recurrent A pulses may be different from the strength of the received recurrent B pulses, said receiver including an electrically controllable variable gain amplifier: an automatic gain control system comprising means coupled to the output of the receiver for switching the received A pulses into a first channel and the received B pulses into a second channel, first means coupled to the output of said switching means and responsive to the recurrent A pulses in said first channel for producing a first output voltage version varying according to the strength of said A pulses, second means coupled to the output of said switching means and responsive to the recurrent B pulses in said second channel for producing a second output voltage version varying according to the strength of said B pulses, means coupled to the output of said first and second producing means and responsive to said first and second voltage versions for producing an output control voltage varying according to the strength of the smaller of said first and second voltage versions, and means coupling said control voltage to the gain control circuit of said variable gain amplifier for substantially suppressing variations in the strength of the smaller of said received output A and B pulses.

2. In a radio navigation receiver responsive to recurrent A pulses transmitted from a master station and to recurrent B pulses transmitted from a slave station, wherein the strength of the received recurrent A pulses may be different from the strength of the received recurrent B pulses, said receiver including an electrically controllable variable gain amplifier: an automatic gain control system comprising means coupled to the output of said receiver for producing a first voltage version varying according to the strength of the received A pulses and a second voltage version varying according to the strength of the received B pulses, means coupled to the output of said producing means and responsive thereto for producing an output control voltage varying according to the strength of the smaller of said received A and B pulses, and means coupling said control voltage to the gain control circuit of said variable gain amplifier for substantially suppressing variations in the strength of the smaller of the received output A and B pulses.

3. In a hyperbolic navigation receiver receptive to master pulses and slave pulses from distant transmitters wherein the strength of the received master pulses may be different from the strength of the received slave pulses, said receiver including an electrically controllable variable gain amplifier: an automatic gain control system comprising means coupled to the output of said receiver and producing a first voltage version varying according to the strength of said received master pulses and a second voltage version varying according to the strength of said received slave pulses, means coupled to the output of said producing means and responsive to said first and second voltage versions for producing an output control voltage whose strength varies according to the strength of the smaller of said first and second voltage versions and independently of the strength of the greater of said versions, and means intercoupling said responsive means and the gain control circuit of said variable gain amplifier for varying the amplification of said receiver in accordance with said control voltage.

4. An automatic gain control system for a hyperbolic navigation receiver responsive to recurrent A pulses transmitted from a master station and to recurrent B pulses transmitted from a slave station, comprising means coupled to the output of said receiver for switching the received A pulses into a first channel and the received B pulses into a second channel, first means coupled to the output of said switching means and responsive thereto for producing a first control voltage varying according to the peak value of the received A pulses, second means coupled to the output of said switching means and responsive thereto for producing a second control voltage varying according to the peak value of said received B pulses, selective means coupled to the output of said first and second producing means for selecting the smaller of said first and second control voltages, and means coupling the selected control voltage to said receiver for substantially suppressing variations in the amplitude of the smaller of the received output A and B pulses.

5. An automatic gain control system comprising variable gain amplifier means receiving first and second independent pulses to be amplified, means coupled to the output of said amplifier for separating the amplified first pulses from the amplified second pulses, means coupled to the output of said separating means for producing an output control voltage varying according to the strength of the smaller of said first and second amplified pulses, and means coupling said control voltage to the gain control circuit of said variable gain amplifier means for substantially suppressing variations in the strength of the smaller of said first and second amplified pulses.

6. Variable gain radio receiving apparatus for receiving first and second recurrent signal wave trains, said receiving apparatus comprising a controllable transmission circuit transmitting said received first and second wave trains, and means responsive to said received first and second wave trains for selectively varying the average transmission response of said controllable transmission circuit inversely according to the strength of the weakest of said first and second recurrent wave trains.

7. An automatic control circuit comprising means alternately producing a first pulse during a first time interval and a second pulse during a second time interval, said means including an electrically controllable transmission circuit for transmitting said first and second pulses, means coupled to the output of said producing means and responsive to said first and second pulses for producing an output control voltage varying according to the strength of the smaller of the first and second output pulses, and means coupling said control voltage to said electrically controllable transmission circuit for substantially suppressing variation of the strength of the smaller of said first and second output pulses.

8. An automatic control circuit comprising means including an electrically controllable transmission circuit, said means being adapted to receive applied voltage waves consisting of recurrent first pulses occurring during first time intervals and recurrent second pulses occurring during second time intervals, means coupled to the output of said transmission circuit means and responsive to the output recurrent first and second pulses for producing an output control voltage varying according to the strength of the smaller of said output recurrent first and second pulses, and means coupling said control voltage to said electrically controllable transmission circuit means for substantially suppressing variations in the strength of the smaller of said output recurrent first and second pulses.

9. In a radio navigation receiver responsive to recurrent A pulses transmitted from a master station and to recurrent B pulses transmitted from a slave station, wherein the strength of the received recurrent A pulses may be different from the strength of the received recurrent B pulses, said receiver including an electrically controllable variable gain amplifier: an automatic gain control system comprising means coupled to the output of said receiver for producing a first control voltage varying according to the strength of the received A pulses and producing a second control voltage varying according to the strength of the received B pulses, selective means coupled to the output of said producing means and responsive to said first and second control voltages for selecting one of said first and second control voltages, and means coupling said selected control voltage to the gain control circuit of said variable gain amplifier for substantially suppressing variations in the amplitude of one of the received output A and B pulses.

10. The automatic gain control system as defined in claim 9, wherein said means coupled to the output of said receiver for producing said first control voltage and said second control voltage includes first and second energy storage means responsive respectively to the peak values of the received A and B pulses, and wherein said selective means coupled to the output of said producing means select the smaller of said first and second control voltages.

11. The automatic gain control system as defined in claim 10, wherein said selective means coupled to the output of said producing means includes first and second intercoupled rectifiers responsive respectively to the magnitudes of said first and second control voltages.

12. The automatic gain control system as defined in claim 10 wherein said means coupled to the output of said receiver for producing said first control voltage and said second control voltage further includes relay switching means for coupling the output of said receiver to said first energy storage means during reception of said A pulses and for coupling the output of said receiver to said second energy storage means during reception of said B pulses.

References Cited in the file of this patent

UNITED STATES PATENTS

| | | |
|---|---|---|
| 2,599,777 | Pierce | June 10, 1952 |
| 2,651,033 | Frantz | Sept. 1, 1953 |